Aug. 7, 1934.  H. T. SONE  1,969,629
ADJUSTABLE CLEVIS CONNECTER FOR PLOWS
Filed Nov. 4, 1933
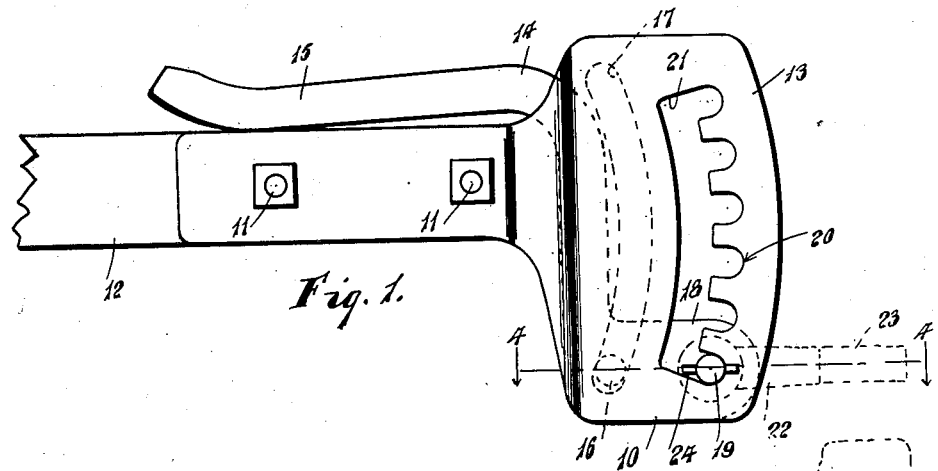
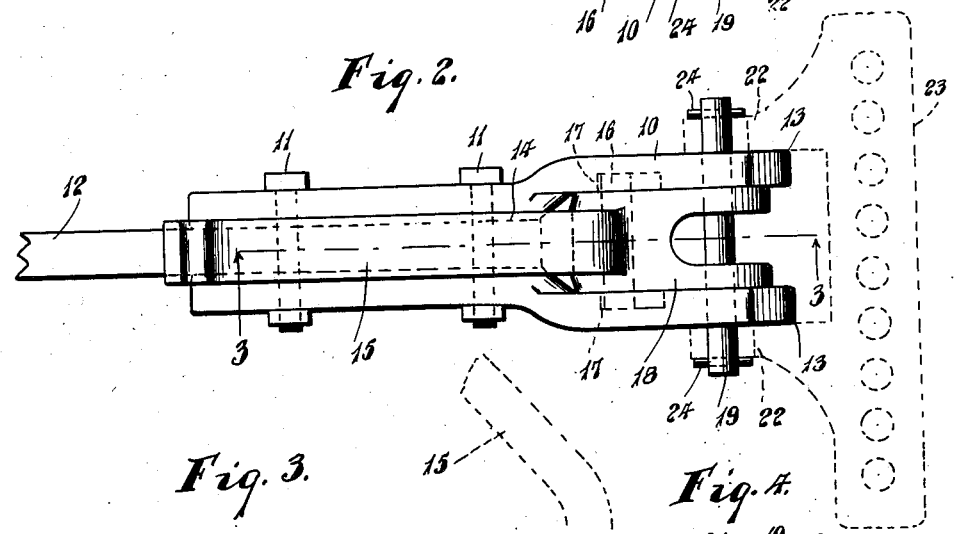
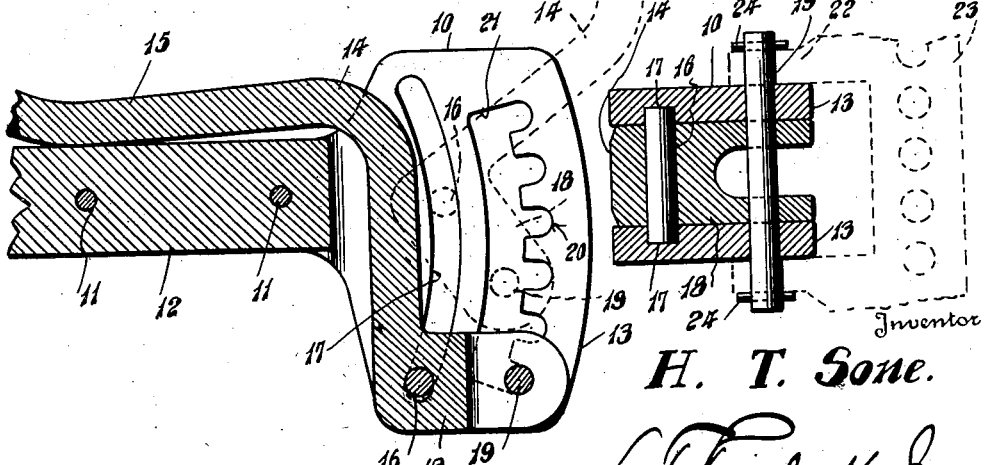
Inventor
H. T. Sone.

Patented Aug. 7, 1934

1,969,629

UNITED STATES PATENT OFFICE 1,969,629

ADJUSTABLE CLEVIS CONNECTER FOR PLOWS

Harold T. Sone, Mayfield, Ark.

Application November 4, 1933, Serial No. 696,699

4 Claims. (Cl. 278—96.2)

This invention relates to a clevis connecter for plows or other agricultural implements or machinery, and it aims to provide an exceedingly simple construction whereby the depth of cut or penetration of the plow may be regulated therefrom without the aid of tools.

The more specific objects and advantages will become apparent from a consideration of the description following taken in connection with accompanying drawing illustrating an operative embodiment.

In said drawing:—

Figure 1 is a view of the device in side elevation,

Figure 2 is a plan view of the device,

Figure 3 is a cross sectional view taken on the line 3—3 of Figure 2, and

Figure 4 is a cross sectional view taken on the line 4—4 of Figure 1.

Referring specifically to the drawing, the device comprises a pair of parallel jaw members 10 connected together by bolts 11 passing therethrough, and disposing them on opposite sides of a beam 12 of a plow, the showing of the beam being conventional as will be understood.

Movable vertically and pivotally between enlarged rear portions 13 of the plates or jaws 10, rearwardly beyond the beam 12, is a lever 14 having a handle or manipulating portion 15 returned toward and over the beam 12.

Said lever 14 carries a pivot member 16 whose ends extend into elongated or arcuate slots 17 in the inner faces of the enlarged portions 13, whereby the pivot means 16 is not only capable of rocking in the slots 17 but also capable of being moved bodily with the lever 15 from end to end of said slots.

Said lever 14 has a forward extension 18 carrying a removable rod 19 which is engageable in a selected notch 20 of a series of such notches provided in the enlargements 13, and connected by elongated slots 21 of which said notches 20 are extensions. The ends of said rod 19 project outwardly beyond the plates 13, so as to extend through lugs 22 or the like of a conventional clevis at 23. Removable pins or other fastening means 24 are passed through the rod 19 to prevent accidental detachment of the rod and clevis.

As a result of my invention, the lever 15 is adapted to be moved upwardly and away from the beam 12, thereby sliding the pivot member 16 in slots 17 and thereby moving the rod 19 out of the engaged notches 20 and into the slots 21, in which position the lever 15 is freely slidable vertically, carrying the clevis 23 therewith, to the end that the rod 19 may be engaged in any of the notches 20 and maintained therein through the lowering of the lever 15 to a position where the pins 16 and 19 are substantially in horizontal alinement. As a result of this construction, the depth of cut of the plow or other implement attached to the clevis 23, may be regulated.

The position wherein the lever 14 may be moved vertically as suggested, is shown in Figure 3.

Various changes may be resorted to provided they fall within the spirit and scope of the invention.

I claim as my invention:—

1. A clevis connection of the class described having spaced plates, a lever between the plates having means for attachment of a clevis thereto, said plates having a series of notches in which said means is adjustably disposable, and means on the plates and lever coacting with the first mentioned means to secure the same against accidental removal from either of said notches.

2. A device of the class described comprising plates, a lever movable between said plates, pivot means on the lever, elongated slots in the plates in which said pivot means move, second elongated slots having notches communicating therewith, and means carried by the lever for attachment of a clevis thereto, said means being movable in the second mentioned slots and engageable with said notches.

3. A device of the class described comprising plates, a lever movable between said plates, pivot means on the lever, elongated slots in the plates in which said pivot means move, second elongated slots having notches communicating therewith, and means carried by the lever for attachment of a clevis thereto, said means being movable in the second mentioned slots and engageable with said notches, said means comprising a rod removably carried by the lever.

4. A device of the class described comprising parallel plates, a lever movable between said plates, each plate having an arcuate groove, each plate having an elongated slot parallel to its groove, notches extending from the slots, said lever having pivot means disposed for fulcruming and travel in said groove, and a pin on said lever to which a clevis is adapted for connection movable in the slot and disposable selectively in the notches.

HAROLD T. SONE.